US006785603B2

(12) United States Patent
Inoue

(10) Patent No.: US 6,785,603 B2
(45) Date of Patent: *Aug. 31, 2004

(54) OPERATION STOP CONTROL METHOD OF INTERNAL COMBUSTION ENGINE FOR VEHICLE

(75) Inventor: Toshio Inoue, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/359,626

(22) Filed: Feb. 7, 2003

(65) Prior Publication Data

US 2003/0163243 A1 Aug. 28, 2003

(30) Foreign Application Priority Data

Feb. 28, 2002 (JP) ....................................... 2002-053068

(51) Int. Cl.[7] ................................................ G06F 19/00

(52) U.S. Cl. .................... 701/112; 123/198 F; 123/493; 201/105

(58) Field of Search ................................ 123/2, 3, 320, 123/321, 198 DB, 198 F, 332, 481, 491, 492, 493, 520; 701/103, 104, 105, 112

(56) References Cited

U.S. PATENT DOCUMENTS 4,481,928 A * 11/1984 Takimoto et al. ........... 123/492
5,601,064 A * 2/1997 Fujimoto et al. ........... 123/491
5,629,853 A * 5/1997 Ogawa et al. .............. 701/103
6,558,289 B2 * 5/2003 Chung ........................... 477/3
6,655,359 B2 * 12/2003 Hasegawa et al. .......... 123/491

FOREIGN PATENT DOCUMENTS

JP A 2000-337238 12/2000

* cited by examiner

*Primary Examiner*—Willis R. Wolfe
*Assistant Examiner*—Johnny H. Hoang
(74) *Attorney, Agent, or Firm*—Oliff & Berridge, PLC

(57) ABSTRACT

When a control determination is made that an operation of an internal combustion engine should be stopped, a fuel adherence reduction operation for reducing the amount of fuel adhered to a wall surface extending from an intake port to a combustion chamber is executed before stopping fuel supply.

18 Claims, 3 Drawing Sheets

OPERATION STOP CONTROL METHOD OF INTERNAL COMBUSTION ENGINE FOR VEHICLE

INCORPORATION BY REFERENCE

The disclosure of Japanese Patent Application No. 2002-53068 filed on Feb. 28, 2002 including the specification, drawings and abstract is incorporated herein by reference in its entirety.

BACKGROUND OF THE INVENTION

1. Field of Invention

This invention relates to an operation control of an internal combustion engine for a vehicle, and particularly to an operation control method when stopping the operation of the internal combustion engine for the vehicle.

2. Description of Related Art

Fuel supply is stopped when stopping the operation of an internal combustion engine. In this case, in many of the current internal combustion engines, particularly in those for vehicles, the fuel supply is finally controlled by a fuel injection valve. Therefore, fuel supply may be stopped such that, after the engine stop is determined, the fuel injection valve is not opened at the next fuel injection timing which is synchronized with an operation cycle of the internal combustion engine. However, some of the fuel is adhered to a wall of a combustion chamber of the internal combustion engine even after the exhaust stroke. Particularly in a port injection type internal combustion engine in which the fuel injection valve injects fuel into an intake port, a large amount of fuel is constantly adhered to a wall surface of the intake port during operation of the engine. Accordingly, even if opening of the fuel injection valve is stopped so as to stop the engine, while the engine keeps rotating under its own inertia for a while, fuel removed from the wall surface is added to the intake air that is taken into a combustion chamber in accordance with such engine rotation.

Stopping of an internal combustion engine, particularly that of an internal combustion engine for a vehicle, has been executed by turning off an ignition switch to shut off all power supplies simultaneously including a fuel injection valve, a fuel pump for supplying the fuel to the fuel injection valve, and in the case of a gasoline engine, an ignition system for igniting an air-fuel mixture. However, in recent vehicles (such as hybrid vehicles and economy-running vehicles) equipped with a vehicle operation control system based on a microcomputer, it is possible to execute any automatic power processing by the vehicle operation control system even after the ignition switch is tuned off. In the hybrid vehicles and economy-running vehicles, the operation of the internal combustion engine is stopped, not only when the ignition switch is turned off, but also as necessary by a control of the vehicle operation control system. Therefore, the following art is suggested in Japanese Patent Laid-Open Publication No. 2000-337238. In a multi-cylinder internal combustion engine, even after the fuel injection to each cylinder is stopped based on an operation stop command, the ignition system is operated and stopping of the ignition system is retarded until all ignition signals, each of which corresponds to an air-fuel mixture of each cylinder formed by the fuel injected immediately before the stop of the fuel injection, are output. Thereafter, the ignition signals are stopped.

As is described in the aforementioned publication, by retarding the stopping of the operation of the ignition system relative to the stopping of the fuel supply when stopping the engine, the air-fuel mixture formed by the fuel injected immediately before the stop of the fuel injection and the fuel adhered to the wall surface can certainly be burned. In this case, however, combustion of the air-fuel mixture carried out due to the extended operation of the ignition system becomes lean combustion with a lean mixture, and thus a large amount of NOx may be generated. Since most of the current internal combustion engines for vehicles have a catalyst for purifying NOx in their respective exhaust system, it may suffice if NOx generated by the aforementioned lean combustion is processed by an exhaust purifying catalyst. Nevertheless, when exhaust gas caused by lean combustion is brought into the catalyst, an NOx purification rate of the catalyst is reduced, and NOx may be discharged without being purified. This issue is particularly critical to those vehicles such as hybrid vehicles and economy-running vehicles whose engine is stopped frequently.

On the other hand, when stopping the engine, in a case where unburned composition such as HC and CO is discharged to the exhaust system and oxidized in an oxidation catalyst and a three-way catalyst without burning the fuel removed from the wall surface extending from the intake port to the combustion chamber of the internal combustion engine by retarding stopping of the ignition system as described in the aforementioned Japanese Patent Laid-Open Publication No. 2000-337238, a large amount of heat is generated in the catalyst, and thus the catalyst may deteriorate due to overheating. Furthermore, in any case, some of the fuel adhered to the wall surface extending from the intake port to the combustion chamber of the internal combustion engine is removed from the wall surface during cranking for restarting the internal combustion engine and then added to the intake air. Of the fuel removed from the wall surface, those removed before the start of combustion during initial cranking is directly discharged from an exhaust port and carried to the catalyst.

As described above, a problem regarding exhaust gas purification caused by adherence of fuel to the wall surface extending from the intake port to the combustion chamber of the internal combustion engine in relation to an engine stop, particularly to a temporary stop of the engine which occurs frequently in a hybrid vehicle and an economy-running vehicle, has two conflicting aspects: when the fuel removed from the wall surface is burned in the engine, the amount of NOx generated by lean combustion may be increased, whereas when the fuel removed is oxidized in the catalyst, the catalyst may be overheated.

SUMMARY OF THE INVENTION

It is an object of the invention to solve, while overcoming the aforementioned conflicting aspects, a problem of exhaust gas purification caused in relation to adherence of fuel to a wall surface extending from an intake port to a combustion chamber of the internal combustion engine as well as an engine stop, particularly a temporary stop of the engine in a hybrid vehicle and an economy-running vehicle.

A first aspect of the invention relates to a control method of an internal combustion engine for a vehicle. This method includes the following steps of: determining whether an operation of the internal combustion engine should be stopped; executing, when it is determined that the operation of the internal combustion engine should be stopped, a fuel adherence reduction operation for reducing the amount of fuel adhered to a wall surface extending from an intake port to a combustion chamber of the internal combustion engine;

and stopping supply of the fuel to the internal combustion engine after the fuel adherence reduction operation is executed.

A second aspect of the invention relates to an internal combustion engine operation control system for a vehicle. This system includes a fuel supply system for supplying fuel to the internal combustion engine, and a controller for controlling the fuel supply system. The controller determines whether an operation of the internal combustion engine should be stopped. If it is determined that the operation of the internal combustion engine should be stopped, the controller executes a fuel adherence reduction operation for reducing the amount of fuel adhered to a wall surface extending from an intake port to a combustion chamber. Furthermore, the controller controls the fuel supply system so as to stop supply of the fuel to the internal combustion engine, after executing the fuel adherence reduction operation.

"An operation state of the vehicle is detected, and the internal combustion engine is automatically stopped based on the detected operation state" does not include "normal stopping of the internal combustion engine by turn-off of an ignition switch by a driver."

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Figure 1:
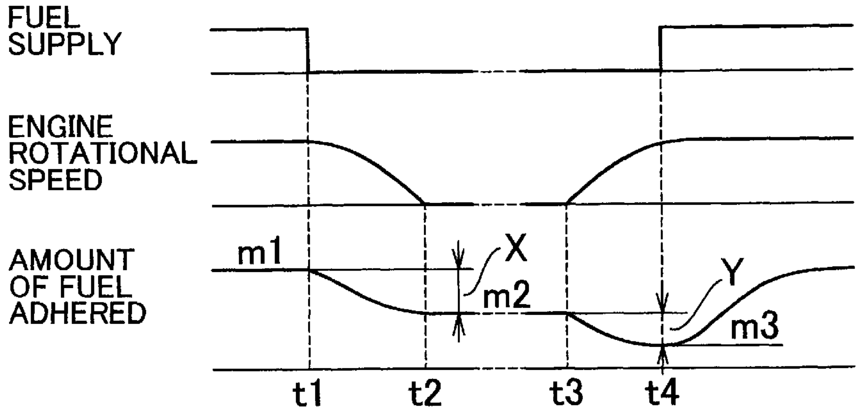
FIG. 1 RELATED ART
FIG. 1 is a graph which shows, in comparison with an engine rotational speed and a fuel supply control according to the related art, the amount of fuel adhered to a wall surface extending from an intake port to a combustion chamber of the internal combustion engine, in a case where an internal combustion engine is restarted after elapse of a temporary time period after the engine is stopped.

In a case where an internal combustion engine is restarted after elapse of a temporary time period after the engine is stopped, just like a temporary stop of the engine in a hybrid vehicle and an economy-running engine, the amount of fuel adhered to a wall surface of an intake port (when port injection is executed) and a combustion chamber, changes as shown in FIG. 1 in comparison with an engine rotational speed and a fuel supply control according to the art disclosed in Japanese Patent Laid-Open Publication No. 2000-337238. That is, when fuel supply is stopped at a time point t1, and the engine comes to a stop at a time point t2 after rotating under its own inertia due to the stop of fuel supply, the amount of fuel adhered is reduced from a level m1 to a level m2 during that period, and the amount of fuel equivalent to a difference X between the two levels is removed from the wall surface and added to the intake air. Then, cranking is started at a time point t3, and when fuel supply is started at a time point t4, the amount of fuel adhered is once further reduced from the level m2 to a level m3, and the amount of fuel equivalent to a difference Y between the two levels is further removed from the wall surface and added to the intake air during cranking. The fuel corresponding to the difference Y is added to the intake air before combustion is started in the engine, and is discharged to an exhaust system without being burned.

Figure 2:
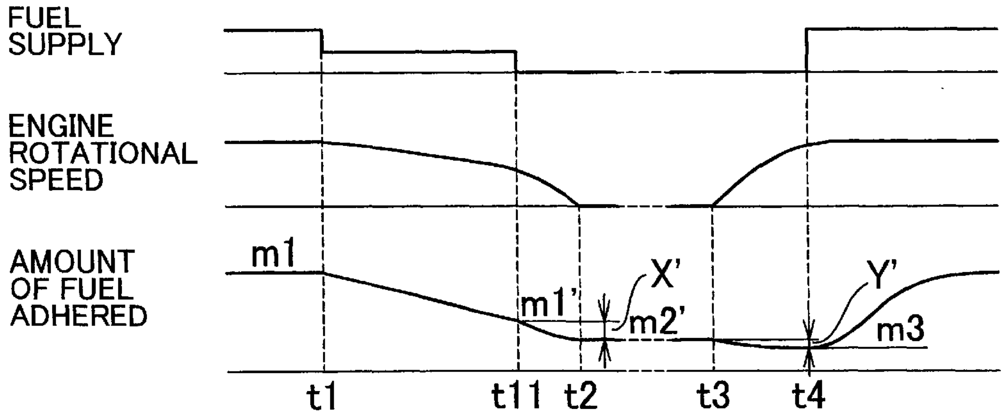
FIG. 2 is a graph which shows, in comparison with an engine rotational speed and a fuel supply control by an engine operation stop control according to an embodiment of the invention, the amount of fuel adhered to a wall surface extending from an intake port to a combustion chamber of the internal combustion engine, in a case where an internal combustion engine is restarted after elapse of a temporary time period after the engine is stopped.

Although various suggestions, in addition to the aforementioned Japanese Patent Laid-Open Publication No. 2000-337238, have been made with respect to a method of purifying the removed fuel that corresponds to the difference X, the removed fuel corresponding to the difference Y is purified in a catalyst. To the contrary, according to an embodiment of the invention, by executing a fuel adherence reduction operation before fuel supply is stopped, the amount of fuel adhered at a time of the fuel supply stop is reduced from a level m1 to a level m1', and the amount of fuel adhered during the engine stop becomes a level m2', as shown in FIG. 2. Therefore, even if a minimum amount of adherence, or a level m3, at a time of engine restart is the same as that in FIG. 1, the differences X and Y are reduced just like differences X' and Y', respectively, and the amount of fuel to be processed is reduced no matter whether the fuel corresponding to the difference X' is burned in the engine or in the catalyst. In FIG. 2, a period from a time point t1 to a time point t11, is a period of the fuel adherence reduction operation, and an example in the drawing illustrates an operation for reducing, the amount of fuel supply so as to reduce an output (load) of the engine. During this period, the engine rotational speed also decreases gradually.

The amount of fuel adhered to the wall surface of the wall surface extending from the intake port to the combustion chamber of the internal combustion engine generally increases and decreases according to the degree of load on the engine. Thus, when it is determined by the vehicle operation control system that the operation of the internal combustion engine should be stopped, the load on the internal combustion engine is once reduced, instead of stopping the fuel supply immediately, so as to temporarily operate the engine under low load condition, thereby enabling a reduction in the amount of fuel adhered. The engine operation under low load condition mentioned above may of course include idling operation, and it may suffice if such operation under low load condition is executed for two to three seconds.

Furthermore, as the degree of vacuum induced in the combustion chamber during the intake stroke becomes higher, more of the fuel adhered to the wall surface extending from the intake port to the combustion chamber of the internal combustion engine is removed from the wall surface, and added to the intake air. Therefore, when it is determined by the vehicle operation control system that the operation of the internal combustion engine should be stopped, the amount of fuel adhered may be reduced by temporarily executing an engine operation which increases the intake vacuum in the combustion chamber, instead of by immediately stopping the fuel supply. Such increase in the intake vacuum is achieved by, for example, when the internal combustion engine is provided with a variable valve timing (VVT) system, advancing a closing phase (closing timing) of the intake valve that is normally positioned after bottom dead center.

Figure 3:
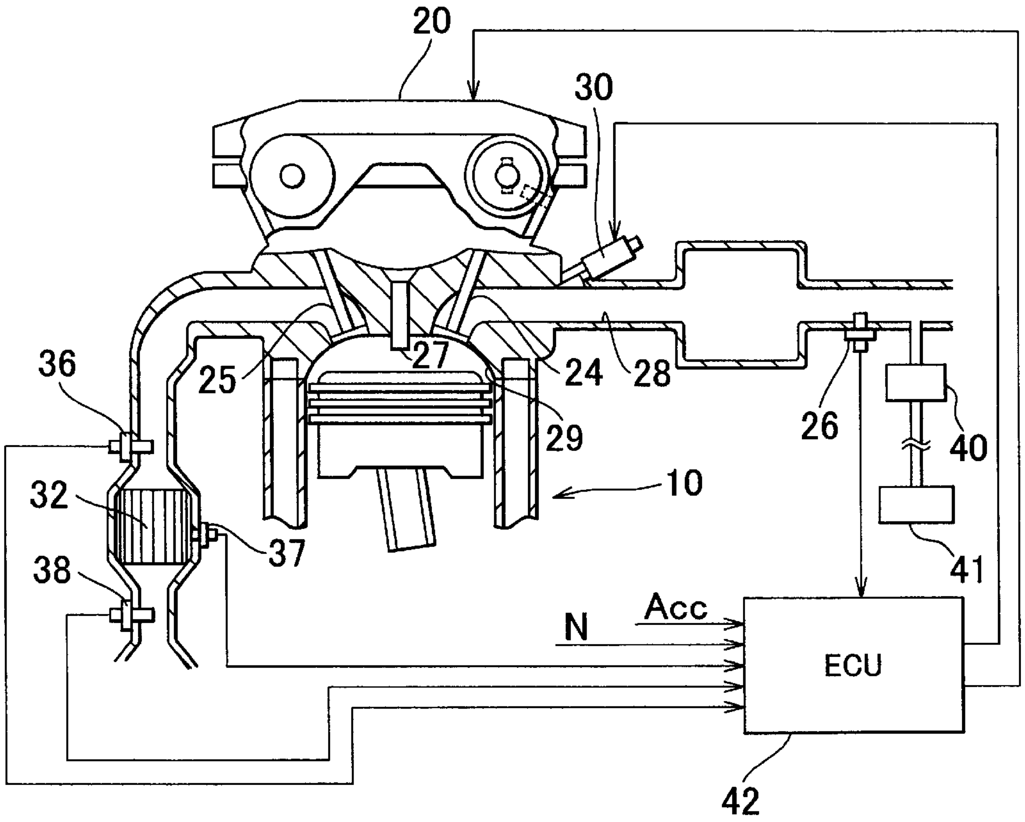
FIG. 3 is a schematic drawing of a structure of the internal combustion engine according to an embodiment of the invention.

Furthermore, when a fuel vapor adsorption system is provided in the intake system of the internal combustion engine, for example, when a canister 40 which is the fuel vapor adsorption system for adsorbing fuel vaporized in a fuel tank 41 is connected to an intake pipe via a pipe as shown FIG. 3, if a control is executed that discharges the fuel vapor from the fuel vapor adsorption system during execution of the fuel adherence reduction operation and adds the fuel vapor to the intake air, the amount of fuel which needs to be supplied by a fuel injection valve so as to maintain the fuel adherence reduction operation can be reduced by the amount of the fuel vapor added. In this manner, the reduction in the amount of fuel adherence by the fuel adherence reduction operation is facilitated more effectively in accordance with the reduction in the amount of fuel injected by the fuel injection valve.

As described above, when stopping the operation of the internal combustion engine, by reducing the amount of fuel adhered to the wall surface extending from the intake port to the combustion chamber of the internal combustion engine prior to the stop of the engine operation, even if the fuel is removed from the wall surface at the time of an engine stop and restart, the amount of the removed fuel can be reduced. Consequently, a burden on a purification process of HC, CO, and NOx from the removed fuel can be reduced.

FIG. 3 is a schematic drawing which shows a general structure of an internal combustion engine, a fuel injection valve of the engine, and other fuel supply means according to an embodiment. An internal combustion engine 10 is provided with a VVT system 20 which is capable of changing a timing of opening and closing an intake valve 24 and an exhaust valve 25, a fuel injection system 30, and an ignition system 27. An ECU 42 corresponding to the vehicle operation control system receives a signal from a temperature sensor 37, that is related to a temperature of a catalyst 32; a signal from an oxygen sensor 36 and an oxygen sensor 38, that is related to an oxygen concentration of exhaust gas upstream and downstream of the catalyst; a signal from an air flow meter 26, that is related to the amount of intake air; a signal from an accelerator opening sensor (not shown), that is related to an accelerator opening Acc; and a signal from a rotational speed sensor (not shown), that is related to an engine rotational speed N of the internal combustion engine. Furthermore, the ECU 42 sends signals corresponding to the aforementioned signals to the fuel injection valve 30, the VVT system 20, and the ignition system 27. In this embodiment, when it is determined that the operation of the internal combustion engine should be stopped, the ECU 42 operates the internal combustion engine 11 such that the fuel adhered to a wall surface of an intake port 28 and a combustion chamber 29 is removed. Furthermore, the structure shown in FIG. 3 is common to that in any case of a general vehicle, a hybrid vehicle and an economy-running vehicle.

Figure 4:
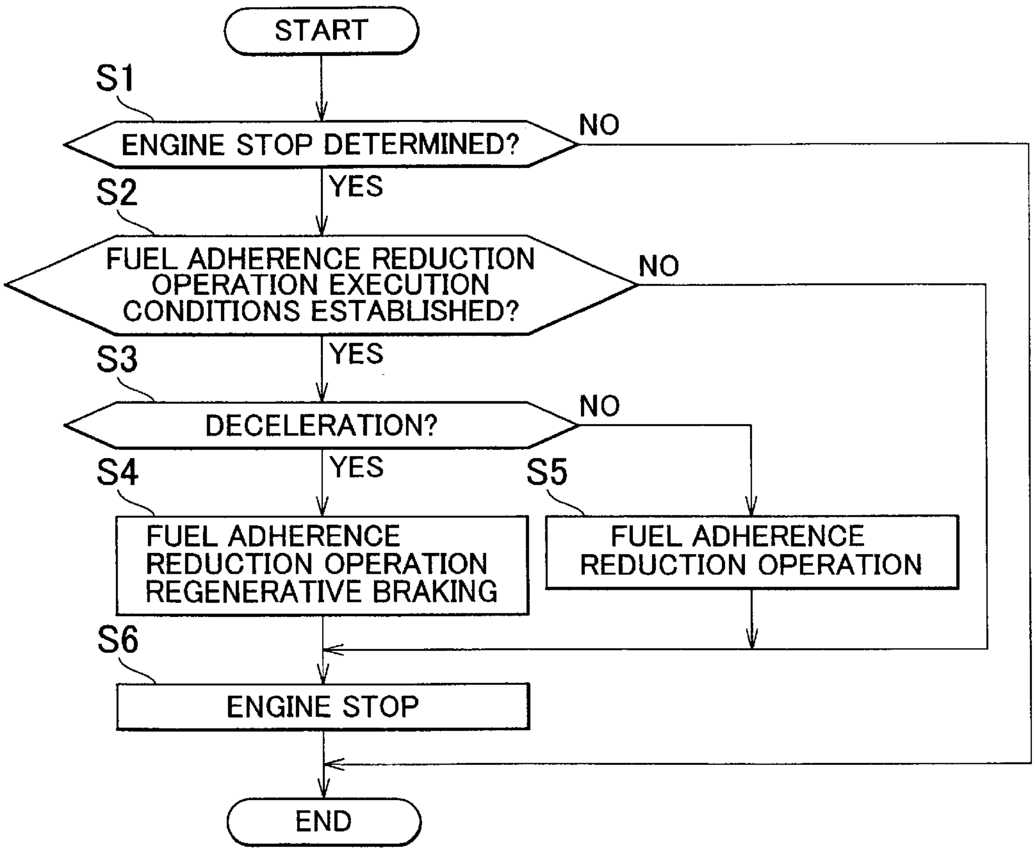
FIG. 4 is a flowchart which illustrates an internal combustion engine operation stop control method according to an embodiment of the invention.

FIG. 4 is a flowchart which comprehensively illustrates an embodiment of an internal combustion engine operation stop control method according to the invention. This flowchart is explained with reference to the structure drawing in FIG. 3, but in vehicles except the hybrid vehicles, steps S3 and S4 may be omitted, or engine brake may be applied in step S4 according to a method other than regenerative braking. The embodiment of the invention relates to a control when stopping the operation of the internal combustion engine whose exhaust system is provided with an exhaust gas purifying catalyst as described above, and is applicable to a vehicle in which the engine is frequently stopped, as is particularly the case with an internal combustion engine of a hybrid vehicle and an economy-running vehicle. Operation of the hybrid vehicle and the economy-running vehicle, and a vehicle operation control system equipped with a microcomputer mounted on the current vehicles, particularly on the hybrid vehicle and the economy-running vehicle, are well known to those skilled in the art, and therefore detailed descriptions thereof are omitted.

A control according to the flowchart in FIG. 4 may be started by closing an ignition switch (not shown) of the vehicle, particularly of the hybrid vehicle and the economy-running vehicle, and starting operation of the vehicle which incorporates the control in accordance with the embodiment of the invention. Once the control is started, in step S1, particularly in the case of the hybrid vehicle or economy-running vehicle, the vehicle operation control system 42 equipped with the computer in the vehicle determines whether a determination that the operation of the internal combustion engine 10 should be stopped is made. If the determination is negative, the process always returns to step S1. When it is determined that the operation of the internal combustion engine 10 should be stopped, the determination in step S1 changes from the negative determination to a positive determination, and the process proceeds to step S2.

In step S2, a determination is made as to whether conditions for executing the fuel adherence reduction operation are established. The conditions may include considerations of whether the amount of fuel adhered to the wall surface of the intake port 28 and the combustion chamber 29 is equal to or more than a predetermined value (condition $\alpha$), whether the purification rate of the catalyst 32 is reduced to or below a predetermined value (condition $\beta$), and whether the catalyst temperature is equal to or higher than a predetermined value (condition $\gamma$). The amount of fuel adhered corresponding to the condition $\alpha$ can be estimated, considering temporary delay of the control, based on the load rate of the internal combustion engine 10, that is, the amount of intake air, engine rotational speed N, advance angle of the VVT system 20, and the like. The purification rate of the catalyst corresponding to the condition $\beta$ can be obtained by measuring the outputs from the oxygen sensors 36, 38 upstream and downstream of the catalyst 32 over time. Furthermore, the catalyst temperature corresponding to the condition $\gamma$ may be detected directly by the catalyst temperature sensor 37, but it may also be estimated considering temporary delay in a temperature change based on the load rate of the internal combustion engine 10. Which one of the aforementioned conditions $\alpha$, $\beta$, and $\gamma$ should mostly be taken into account, or how these conditions should be combined may be determined considering other design specifications in a specific design of the vehicle.

If the determination in step S2 is negative, the process immediately proceeds to step S6, which is to be described later, to stop the engine. This process may also be a stopping of fuel supply. To the contrary, if the determination in step S2 is positive, the process proceeds to step S3 to determine whether the vehicle is currently in a state in which deceleration should be executed, that is whether the engine stop determination made in step S1 is based on a release operation of an accelerator pedal by a driver. In the case of the hybrid vehicle or economy-running vehicle, a temporary stop and restart of the internal combustion engine 10 is executed by the control determination of the vehicle operation control system 42 based on various parameters related to a vehicle operation state. Such parameters of course include the amount of depression of the accelerator pedal by the driver. Therefore, particularly in the hybrid vehicle, a temporary stop of the internal combustion engine can be generally classified into an engine stop based on a determination made by the vehicle operation control system to switch the vehicle driving from the driving by the internal combustion engine to the driving by an electric motor according to the operation state of the vehicle, and an engine stop due to the vehicle entering a deceleration mode by the release operation of the acceleration pedal by the driver.

Then, when the determination in step S3 is positive, the process proceeds to step S4 in which the fuel adherence reduction operation is executed in the internal combustion engine, and at the same time, regenerative braking is executed, which applies a braking force to a wheel drive shaft, by bringing a motor generator (not shown) connected to the wheel drive shaft into a power generation state, thereby giving the driver a sense of engine brake to the vehicle even during the fuel adherence reduction operation. To the contrary, if the determination in step S3 is negative, that is, if the determination to stop the operation of the internal combustion engine in step S1 is based not on the release operation of the accelerator pedal by the driver, but on the control determination, by the vehicle operation control system, that relates to a combination of the internal combustion engine operation and the electric motor operation, the process proceeds to step S5 in which only the fuel adherence reduction operation is executed in the internal combustion engine 10 with no regenerative braking being executed.

As mentioned above, in any case, when the operation of the internal combustion engine is stopped based on the control determination by the vehicle operation control system, the fuel adherence reduction operation is executed for reducing the fuel adhered to the wall surface extending from the intake port to the combustion chamber of the internal combustion engine prior to the engine stop. The fuel adherence reduction operation is an engine operation which, instead of stopping fuel supply, once reduces the load on the internal combustion engine to temporarily operate the engine under low load condition, or increases the intake vacuum within the combustion chamber. When the VVT system is provided, an operation to be executed may be such that a closing phase of the intake valve which is normally positioned after bottom dead center is advanced, and the amount that the intake air taken into a cylinder before a piston reaches bottom dead center is returned after bottom dead center is reduced. Furthermore, in this case, if the fuel vapor adsorption system is provided in the intake system of the internal combustion engine, fuel vapor may be discharged from the fuel vapor adsorption system and added to the intake air, and the amount of fuel that needs to be supplied from the fuel injection valve in order to maintain the fuel adherence reduction operation may be reduced by the amount of fuel vapor added. Then, after the fuel adherence reduction operation is executed, fuel supply to the internal combustion engine is stopped so as to stop the engine. Time required for the fuel adherence reduction operation may be about two to three seconds as mentioned above, and even when the temporary stop of the internal combustion engine is based on the release operation of the accelerator pedal by the driver, the fuel adherence reduction operation takes only a shot amount of time so it normally does not interfere with operation of the vehicle.

Meanwhile, in the flowchart in FIG. 4, confirmation of conditions for executing the fuel adherence reduction operation in step S2 may not necessarily be conducted, and when the determination for the engine stop is made, the fuel adherence reduction operation may always be executed prior to execution of the engine stop. Furthermore, in executing the fuel adherence reduction operation, the deceleration determination in step S3, that is, the determination as to whether the engine stop determination in step S1 is based on the release operation of the accelerator pedal by the driver may also be omitted. The control of the internal combustion engine by the vehicle operation control system based on the accelerator pedal operation by the driver may include, in addition to an internal combustion engine operation stop control according to the invention, a control which gives a driver a sense of engine brake as appropriate.

One comprehensive embodiment of the invention has been described in detail above, however, it is apparent to those skilled in the art that the embodiment includes the omissions mentioned earlier and that various modifications with respect to the embodiment are possible within the scope of the invention.

What is claimed is:

1. A control method of an internal combustion engine for a vehicle, comprising the following steps of:

determining whether an operation of the internal combustion engine should be stopped;

executing, when a determination that the operation of the internal combustion engine should be stopped is made, a fuel adherence reduction operation for reducing an amount of a fuel adhered to a wall surface extending from an intake port to a combustion chamber; and stopping supply of the fuel to the internal combustion engine after executing the fuel adherence reduction operation.

2. The method according to claim 1, wherein the fuel adherence reduction operation is executed to reduce a load on the internal combustion engine.

3. The method according to claim 1, wherein the fuel adherence reduction operation is executed to increase an intake vacuum in the internal combustion engine.

4. The method according to claim 3, wherein a valve closing timing of an intake valve during intake stroke of the internal combustion engine is advanced to increase the intake vacuum.

5. The method according to claim 1, wherein the fuel adherence reduction operation includes discharging a fuel vapor from a fuel vapor adsorption system and adding the fuel vapor to an intake air.

6. The method according to claim 1, wherein a determination that the fuel adherence reduction operation should be executed is made when at least one of the following conditions are satisfied: a condition that the amount of the fuel adhered to the wall surface extending from the intake port to the combustion chamber is equal to or more than a predetermined value; a condition that a purification rate of a catalyst for purifying an exhaust gas of the internal combustion engine is equal to or lower than a predetermined value; and a condition that a temperature of the catalyst is equal to or higher than a predetermined value.

7. The method according to claim 1, wherein an operation state of the vehicle is detected, and the internal combustion engine is automatically stopped based on the detected operation state.

8. The method according to claim 7, wherein the vehicle is driven by the internal combustion engine and an electric motor, wherein the vehicle is operated by a driving force of the electric motor when the internal combustion engine is stopped based on the control determination, and the vehicle is applied with a braking force by a regenerative braking while the fuel adherence reduction operation is executed when the vehicle is in a deceleration state.

9. The method according to claim 7, wherein the internal combustion engine is temporarily stopped as appropriate when the vehicle stops temporarily.

10. An internal combustion engine operation control system for a vehicle, comprising:

a fuel supply system which supplies a fuel to the internal combustion engine; and a controller which determines whether an operation of the internal combustion engine should be stopped, executes, when a determination that the operation of the internal combustion engine should be stopped is made, a fuel adherence reduction operation for reducing an amount of a fuel adhered to a wall surface extending from an intake port to a combustion chamber, and controls the fuel supply system so as to stop supply of the fuel to the internal combustion engine after executing the fuel adherence reduction operation.

11. The internal combustion engine operation control system according to claim 10, wherein the controller executes the fuel adherence reduction operation to reduce a load on the internal combustion engine.

12. The internal combustion engine operation control system according to claim 10, wherein the controller executes the fuel adherence reduction operation to increase an intake vacuum in the internal combustion engine.

13. The internal combustion engine operation control system according to claim 12, wherein the controller advances a valve closing timing of an intake valve during intake stroke of the internal combustion engine to increase the intake vacuum.

14. The internal combustion engine operation control system according to claim 10, wherein the controller discharges a fuel vapor from a fuel vapor adsorption system so as to add the fuel vapor to an intake air during the fuel adherence reduction operation includes.

15. The internal combustion engine operation control system according to claim 10, wherein the controller determines that the fuel adherence reduction operation should be executed is made when at least one of the following conditions are satisfied: a condition that the amount of the fuel adhered to the wall surface extending from the intake port to the combustion chamber is equal to or more than a predetermined value; a condition that a purification rate of a catalyst for purifying an exhaust gas of the internal combustion engine is equal to or lower than a predetermined value; and a condition that a temperature of the catalyst is equal to or higher than a predetermined value.

16. The internal combustion engine operation control system according to claim 10, wherein the internal combustion engine operation control system further comprises a detector that detects an operation state of the vehicle, and the controller stops the internal combustion engine automatically based on the detected operation state.

17. The internal combustion engine operation control system according to claim 16, wherein the vehicle is driven by the internal combustion engine and an electric motor, the controller operates the vehicle by a driving force of the electric motor when the internal combustion engine is stopped based on the control determination, the controller determines whether the vehicle is in the deceleration state based on the detected operation state of the vehicle, and the controller applies the vehicle with a braking force by regenerative braking while the fuel adherence reduction operation is executed when it is determined that the vehicle is in the deceleration state.

18. The internal combustion engine operation control system according to claim 16, wherein the controller stops the internal combustion engine temporarily as appropriate when the vehicle stops temporarily.

* * * * *